United States Patent
Zeng

(10) Patent No.: US 8,260,539 B2
(45) Date of Patent: Sep. 4, 2012

(54) OBJECT AND VEHICLE DETECTION AND TRACKING USING 3-D LASER RANGEFINDER

(75) Inventor: Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 273 days.

(21) Appl. No.: 12/778,766

(22) Filed: May 12, 2010

(65) Prior Publication Data

US 2011/0282581 A1  Nov. 17, 2011

(51) Int. Cl.
*G06F 17/10* (2006.01)
(52) U.S. Cl. .......................................... 701/301
(58) Field of Classification Search .................. 701/300, 701/301
See application file for complete search history.

(56) References Cited

U.S. PATENT DOCUMENTS

| | | | |
|---|---|---|---|
| 6,687,577 B2 | 2/2004 | Strumolo | |
| 6,847,894 B1 | 1/2005 | Hasegawa | |
| 7,068,815 B2 | 6/2006 | Chang et al. | |
| 7,418,346 B2 | 8/2008 | Breed et al. | |
| 7,486,803 B2 | 2/2009 | Camus | |
| 7,512,251 B2 | 3/2009 | Nobori et al. | |
| 7,583,817 B2 | 9/2009 | Kimura et al. | |
| 8,090,491 B2 * | 1/2012 | Barfoot et al. | 701/25 |
| 2005/0007450 A1 * | 1/2005 | Hill et al. | 348/142 |
| 2006/0115113 A1 | 6/2006 | Lages | |
| 2008/0046181 A1 | 2/2008 | Koike et al. | |
| 2009/0043439 A1 * | 2/2009 | Barfoot et al. | 701/25 |
| 2012/0035798 A1 * | 2/2012 | Barfoot et al. | 701/25 |

FOREIGN PATENT DOCUMENTS

| | | |
|---|---|---|
| DE | 41 15 747 A1 | 11/1992 |
| DE | 103 19 700 A1 | 11/2004 |
| DE | 103 53 347 A1 | 6/2005 |
| WO | WO 2009/033286 A1 | 3/2009 |

* cited by examiner

*Primary Examiner* — David H Bollinger
(74) *Attorney, Agent, or Firm* — John A. Miller; Miller IP Group, PLC

(57) ABSTRACT

A method and system for detecting and tracking objects near a vehicle using a three dimensional laser rangefinder. The method receives points from the laser rangefinder, where the points represent locations in space where the rangefinder senses that some object exists. An algorithm first estimates the location of a ground plane, based on a previous ground plane location, data from onboard sensors, and an eigenvector calculation applied to the point data. Next, a plan view occupancy map and elevation map are computed for stationary objects, based on point data in relation to the ground plane. Finally, dynamic objects are detected and tracked, sensing objects which are moving, such as other vehicles, pedestrians, and animals. The output of the method is a set of stationary and dynamic objects, including their shape, range, and velocity. This output can be used by downstream applications, such as collision avoidance or semi-autonomous driving systems.

20 Claims, 7 Drawing Sheets

OBJECT AND VEHICLE DETECTION AND TRACKING USING 3-D LASER RANGEFINDER

BACKGROUND OF THE INVENTION

1. Field of the Invention

This invention relates generally to an object detection method and system and, more particularly, to an object detection method and system for a vehicle which uses a three dimensional laser rangefinder to detect and track both stationary and moving objects in the vicinity of the vehicle, providing a source of input for downstream vehicle control applications.

2. Discussion of the Related Art

Many modern vehicles include a variety of sophisticated electronic systems for safety and navigation assistance. In some vehicles, these systems include object detection and adaptive cruise control systems, which can alert a driver to an obstacle near the vehicle, or even control the vehicle's brakes or steering to maintain a safe distance to another vehicle or object. However, object detection systems known in the art and available on the market have limitations in terms of how well they can detect and track objects, and how reliably the object data can be used for vehicle control purposes.

Most object detection systems available in vehicles today utilize radar or camera-based vision technology. These systems often have problems distinguishing between objects in cluttered environments typically found in realistic driving situations. They may be able to detect the two dimensional shape of an object, but not be able to determine the object's height, thus unable to determine if the object is actually a feature of the ground or road surface. Or they may be able to detect the presence of objects, but unable to distinguish between closely spaced objects based on relative velocity or three dimensional characteristics. Finally, existing radar or camera-based object detection systems may completely fail to detect some objects, due to a lack of reflectivity or lack of color differentiation of the objects.

A need exists for a reliable and robust object detection system—one which can distinguish objects from each other and from the ground plane, which can reliably track both the position and velocity of detected objects relative to the ground and relative to the host vehicle, and which can perform these tasks in the cluttered environment of real-world driving. Such a system could enable a significant breakthrough in the development of advanced vehicle systems, such as semi-autonomous driving systems.

SUMMARY OF THE INVENTION

In accordance with the teachings of the present invention, a method and system are disclosed for detecting and tracking objects near a vehicle using a three dimensional laser rangefinder. The method receives clouds of points from the laser rangefinder, where the points represent locations in space where the rangefinder senses that some object exists. An algorithm first estimates the location of a ground plane, based on a previous ground plane location, data from chassis dynamics sensors, and an eigenvector calculation applied to the point cloud data. A non-flat, segmented ground surface can also be constructed. Next, a plan view occupancy map and elevation map are computed for stationary objects, based on point cloud data in relation to the ground surface. Finally, dynamic objects are detected and tracked, sensing objects which are moving relative to the ground, such as other vehicles, pedestrians, and animals. The output of the method is a set of stationary and dynamic objects, including their size and shape, range, and velocity relative to the ground and to the host vehicle. This output data can be used by downstream applications, such as collision avoidance or semi-autonomous driving systems.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method and system for object detection and tracking using a three dimensional laser rangefinder is merely exemplary in nature, and is in no way intended to limit the invention or its applications or uses.

Vehicle collision avoidance and semi-autonomous driving systems require very accurate information about objects in their surrounding environment in order to be effective. Traditional object detection systems using radar or camera-based vision technology can have problems discerning objects in the cluttered environment that is typical of real-world driving situations. For example, radar-based systems may not reliably detect non-metallic objects, such as concrete curbs, rocks, and vegetation. And camera-based vision systems can have difficulty discerning between objects of similar color or brightness, and cannot directly measure range or distance to an object. In the present invention, a three dimensional (3-D) laser rangefinder is used to obtain a cloud of points representing objects in a host vehicle's vicinity, and specialized algorithms are used to compute a ground plane and a map of stationary and dynamic objects in the space surrounding the vehicle.

Figure 1:
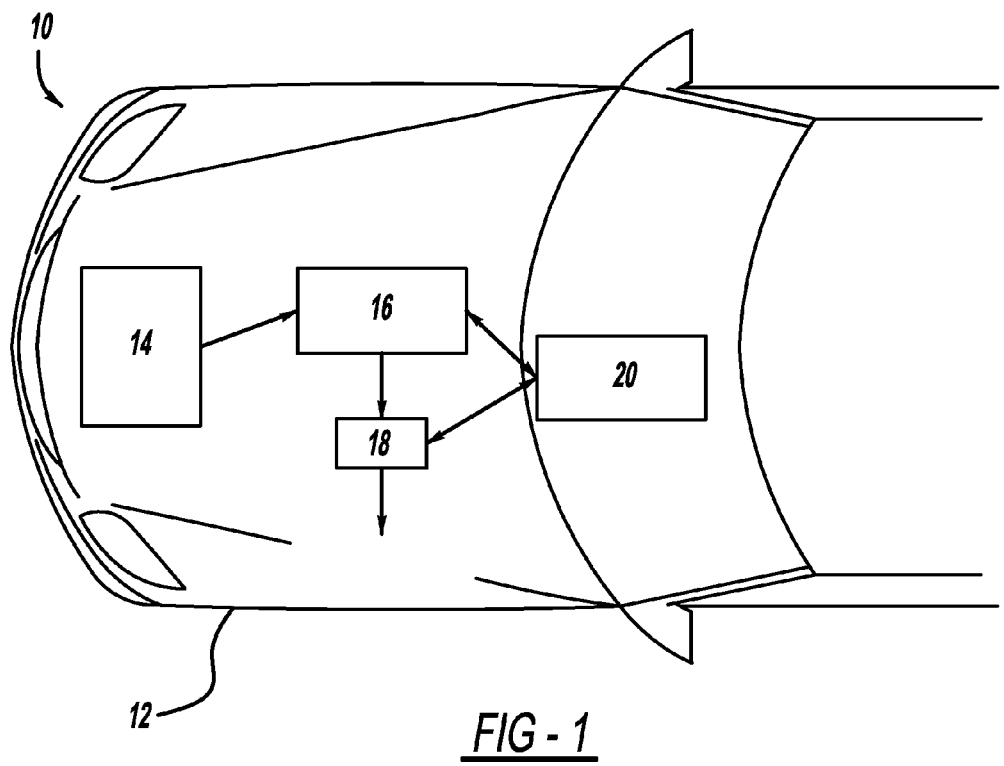
FIG. 1 is a block diagram of a hardware system which can be used for object detection and tracking according to an embodiment of the present invention.

FIG. 1 is a block diagram of a hardware system 10 which can be used for object detection and tracking according to the present invention. A vehicle 12 contains a 3-D laser rangefinder 14 capable of rapidly scanning the environment surrounding the vehicle 12 in three dimensions. More than one laser rangefinder 14 may be used if appropriate, to more completely and quickly scan the complete 360-degree horizon. The laser rangefinder 14, using technology sometimes known as light detection and ranging (LIDAR), provides a cloud of point data representing objects which have been hit by the laser. The points may be represented by the laser rangefinder 14 in terms of azimuth and elevation angles plus range, which can easily be converted to (x, y, z) point data relative to a local coordinate frame attached to the vehicle 12. The laser rangefinder 14 provides point cloud data to a field-programmable gate array (FPGA) 16—which is an integrated circuit designed to be configured by the customer, in this case the vehicle manufacturer, after it is made.

The FPGA 16 receives the point cloud data from the rangefinder 14 and performs a series of calculations directed to ground plane and object detection. The functions of the FPGA 16 could be handled by any suitable processor, including a general-purpose electronic control unit, or an application-specific integrated circuit (ASIC). An application-specific integrated circuit is an integrated circuit customized for a particular use, rather than intended for general-purpose use. Because of the high development costs of ASICs, and the high cost of full-function electronic control units, the FPGA 16 is envisioned in a preferred embodiment of the hardware system 10.

The FPGA 16 sends its output to another processor, in this case a digital signal processor (DSP) 18. The DSP 18 performs additional calculations, discussed below, on the point cloud data and the previously-calculated object data, resulting in a complete representation of the ground plane, static objects, and dynamic objects in the vicinity of the vehicle 12. The FPGA 16 and the DSP 18 both have access to a shared memory module 20.

Figure 2:
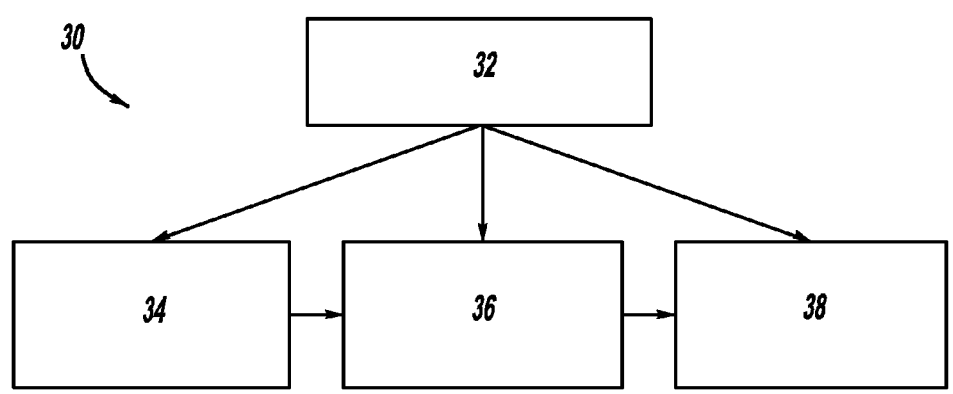
FIG. 2 is a block diagram of a software system for detecting and tracking objects using the elements of the hardware system of FIG. 1.

FIG. 2 is a block diagram of a software system 30 for detecting and tracking objects using the elements of the hardware system 10. An overall image processing module 32 manages the functions of the entire software system 30. A ground plane tracking module 34 uses the point cloud data and other information to estimate the current position of the ground surface, as will be discussed in detail below. Next, a stationary occupancy map module 36 computes the location and height of all detected objects, using the point cloud data and the previously-computed ground surface as input. Details of the calculations in the stationary occupancy map module 36 will also be provided below. Finally, a dynamic object tracking module 38 computes the shape, position, and velocity of moving objects, using methodology detailed below.

Figure 3:
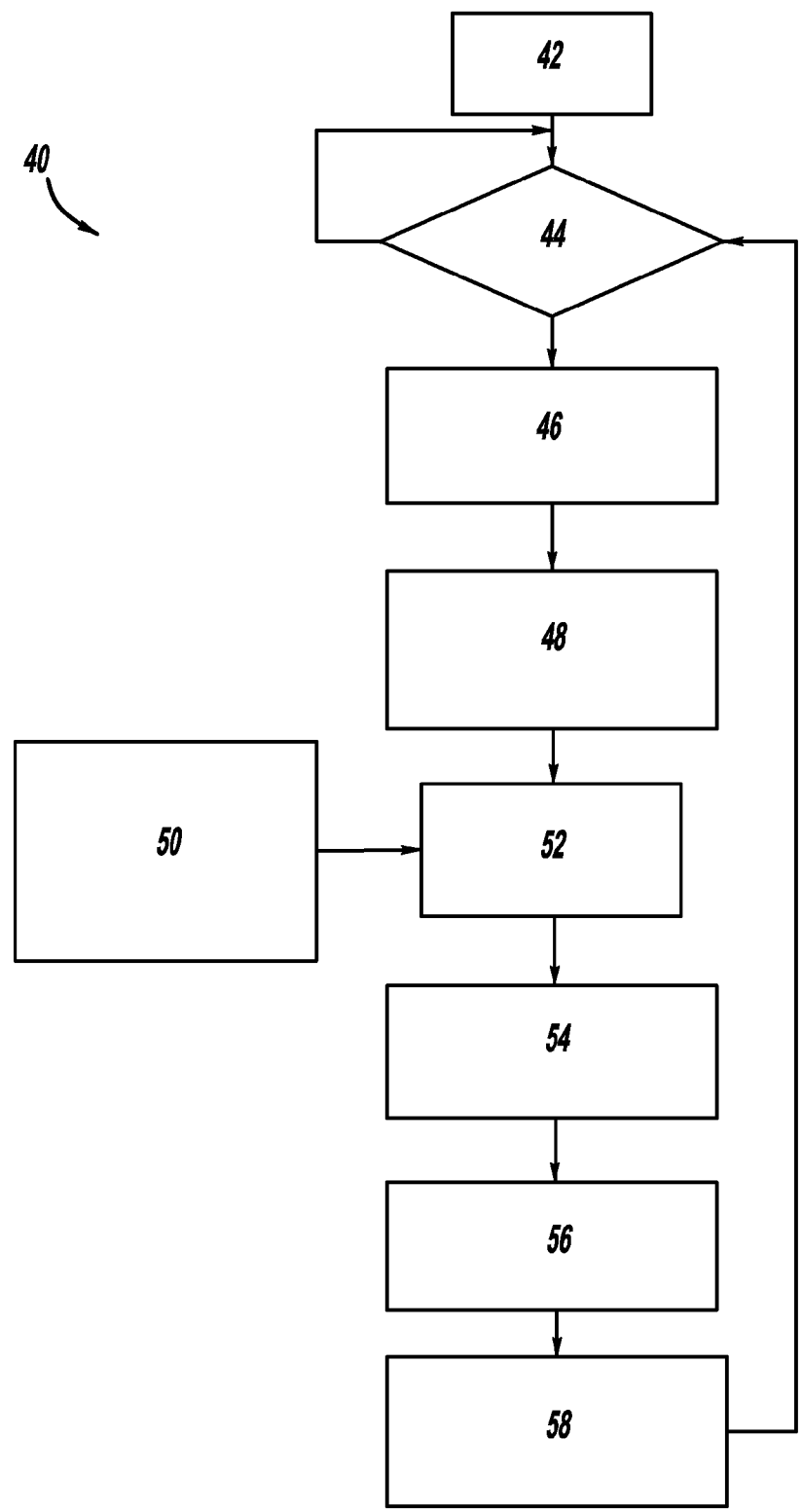
FIG. 3 is a flow chart diagram of a process used by the ground plane tracking module of the software system of FIG. 2.

FIG. 3 is a flow chart diagram 40 of a process used by the ground plane tracking module 34 of the software system 30. The process starts at box 42 as directed by the overall image processing module 32, for example, when the vehicle's engine is started. The process waits at decision diamond 44 for new data from a previous ground plane estimation to become available. At box 46, an estimated ground plane from a previous calculation step is used as a basis or starting point for a new ground plane calculation. In the first pass through the process after the vehicle 12 is started, when no immediately prior ground plane data is available, either the last ground plane from the previous operation of the vehicle 12 could be used at the box 46, or a default value based on the vehicle's nominal ride height could be used at the box 46. At box 48, a prediction is made regarding the expected movement of the ground plane relative to the previous ground plane from the box 46. The prediction at the box 48 is based on an onboard inertial measurement unit (IMU), of the type available in many modern vehicles. The data from the IMU which is used in the prediction at the box 48 includes vehicle pitch and roll angles, which would have a significant impact on the location and orientation of the ground plane if those angles had changed since the previous ground plane calculation.

At box 50, the latest point cloud data from the laser rangefinder 14 are provided. This includes all point data, including points representing tall objects which are well above ground level. At box 52, a gating or filtering is performed on the point cloud data, to select only the points which are estimated to represent the ground plane. The gating operation at the box 52 is performed by calculating the distance of each point to the predicted ground plane. A threshold height, such as 0.25 meters, is defined, and any point whose distance to the ground plane is smaller than the threshold is considered to be a ground point. All other points, that is, those whose distance to the ground plane are larger than the threshold distance, are considered to be object points, and are not used in the ground plane computation.

At box 54, the set of points representing the ground plane are used for further analysis. It is noted that the points provided at the box 54 are not all in one plane. Rather, the points output from the gating operation at the box 52, which are used at the box 54, are the points which are believed to be returned by the ground or road surface, and these points are to be used in a computation to determine a plane which best fits them. At box 56, the ground points from the box 54 are placed in a 4×N matrix, and an eigenvalue decomposition is performed on the matrix, with the objective of finding the ground plane represented by the equation;

$$Ax+By+Cz+D=0 \tag{1}$$

The activities of the box 56 are performed as follows. The (x, y, z) coordinates for each of the N ground points from the box 54 are used to populate the first three columns of the 4×N matrix, with the number 1 in the fourth column. That is, the first row of the matrix would consist of the coordinates of the first ground point, plus the number 1, as follows; $[x_1, y_1, z_1, 1]$. The second row of the matrix would consist of the coordinates of the second ground point, plus the number 1, as follows; $[x_2, y_2, z_2, 1]$. In this way, the 4×N matrix is populated with all ground points from the box 54. Then eigenvalue decomposition can be performed on the matrix, yielding a set of eigenvalues and eigenvectors, as described below. The smallest eigenvalue can be considered to have an eigenvector consisting of the coefficients [A, B, C, D] from the equation of the plane which best fits the point data contained in the matrix. At box 58, an updated ground plane is defined using Equation (1) and the coefficients [A, B, C, D] just determined at the box 56, and the process loops back to the decision diamond 44.

Following is a detailed discussion of the calculations used in the process shown on the flow chart diagram 40. At the box 48, let the IMU measurement of pitch rate and roll rate of the host vehicle be $\dot{\phi}$ and $\dot{\varsigma}$ respectively, which is the change rate of the pitch angle ($\phi$) and roll angle ($\varsigma$) of the normal n to the ground plane. A coordinate system $O_{xyz}$ is fixed with the vehicle frame. Let the ground plane to be estimated be denoted as;

$$n^T p + d = 0 \tag{2}$$

where n denotes the unit normal vector of the plane (i.e., $\|n\|=1$), $|d|$ denotes the distance from the 3D sensor to the ground plane, and p denotes the point on the plane.

The normal to the ground plane n can be represented as the pitch angle ($\phi$) and roll angle ($\varsigma$) with respect to the host vehicle's coordinate system. The state vector for the ground plane is defined as $x=(\phi, \varsigma, d)^T$.

The algorithm starts whenever new data arrives. Let the ground plane at previous time instance be denoted as x, and the state vector at the current time instance be denoted as x'. Then the system dynamic equation can be written as;

$$\phi'=\phi+\Delta T\dot{\phi}+v_\phi$$

$$\varsigma'=\varsigma+\Delta T\dot{\varsigma}+v_\varsigma$$

$$d'=d+v_d \quad (3)$$

or in short as;

$$x'=x+u_G+v_G \quad (4)$$

where $\Delta T$ is the sample time interval, $u_G=(\Delta T\dot{\phi}, \Delta T\dot{\varsigma}, 0)^T$ is the control input vector, and $v_G=(v_\phi, v_\varsigma, v_d)^T$ is the noise term, modeled as zero-mean white Gaussian distribution.

The predicted ground plane x' can be transformed into Cartesian equation form: $n'^T p+d'=0$ where $$n' = \frac{a}{\|a\|}$$

with $\alpha=(\tan \phi', \tan \varsigma', 1)^T$ and $\|\bullet\|$ being the Euclidean norm operator.

Let $D=|n'^T p_i+d'|$ be the distance from the point p to the ground plane. The gating operation at the box 52 in the flow chart diagram 40 selects ground points from the collected 3D point clouds from the 3D sensor by the following criteria; if $D \leq T_H$ then the point p is a ground point and selected; otherwise p is an object or obstacle point. Here, $T_H$ is an elevation threshold, such as 0.25 meters.

Let the set of ground points be denoted as; $\{p_i|i=1,\ldots,M\}$, $\forall i |n'^T p_i+d'|<=T_H$. The ground points are fit using the plane equation $A_m x+B_m y+C_m z+d_m=0$ by minimizing the following least squares;

$$\operatorname*{argmin}_{y}\|Dy\| \quad (5)$$

where $y=(A_m, B_m, C_m, d_m)^T$ and;

$$D = \begin{bmatrix} x_1 & y_1 & z_1 & 1 \\ x_2 & y_2 & z_2 & 1 \\ \vdots & \vdots & \vdots & \vdots \\ x_M & y_M & z_M & 1 \end{bmatrix} \quad (6)$$

The solution of Equation (4) is the eigenvector of the smallest eigenvalue of the matrix D, that is;

$$Dy=\lambda_m y \quad (7)$$

where $\lambda_m$ is the smallest eigenvalue.

Let $y=(y_A, y_B, y_C, y_D)^T$ and $R=\sqrt{y_A^2+y_B^2+y_C^2}$. Then $A_m=y_A/R$, $B_m=y_B/R$, $C_m=y_C/R$, and $d_m=y_D/R$.

Thus a Kalman filter measurement equation can be written as a function of state variables pitch angle ($\phi$), roll angle ($\varsigma$), and distance offset (d);

$$A_m/C_m=\tan \phi+w_\phi$$

$$B_m/C_m=\tan \varsigma+w_\varsigma$$

$$d_m=d+w_d \quad (8)$$

or in short as;

$$o_G=h(x)+w_G \quad (9)$$

where $o_G=(A_m/C_m, B_m/C_m, d_m)^T$ and $w_G=(w_\phi, w_\varsigma, w_d)^T$ is the measurement noise term, usually modeled as a white zero-mean Gaussian random vector.

An extended Kalman filter procedure based on Equations (4) and (9) is applied in the Update ground plane operation at the box 58 in the flow chart diagram 40.

It is noted that the output of the ground plane tracking module 34 and the process of the flow chart diagram 40 is a true plane in the mathematical sense. That is, the ground plane is not represented by a potentially ambiguous cluster of points in 3-D space, but rather is represented by the definitive mathematical formulation of Equation (2).

The ground plane described above is only an approximation of the road surface. There are many cases where the road surface is not flat; for example, water drainage gradient, approaching a graded road, small discontinuities such as dips and curbs, and roads with super-elevation. To account for this, it is also possible to represent the road as a faceted or segmented surface rather than a planar surface.

Given the planar ground approximation as the equation $n^T p+d=0$ (i.e., the result of the ground plane tracking module described above), the 3D point p can be represented as a mapping from a ground plane projection point p' to an elevation e, or a function represented by sample set $\{(p'_k, e_k)| k=1, \ldots, N\}$.

Figure 4:
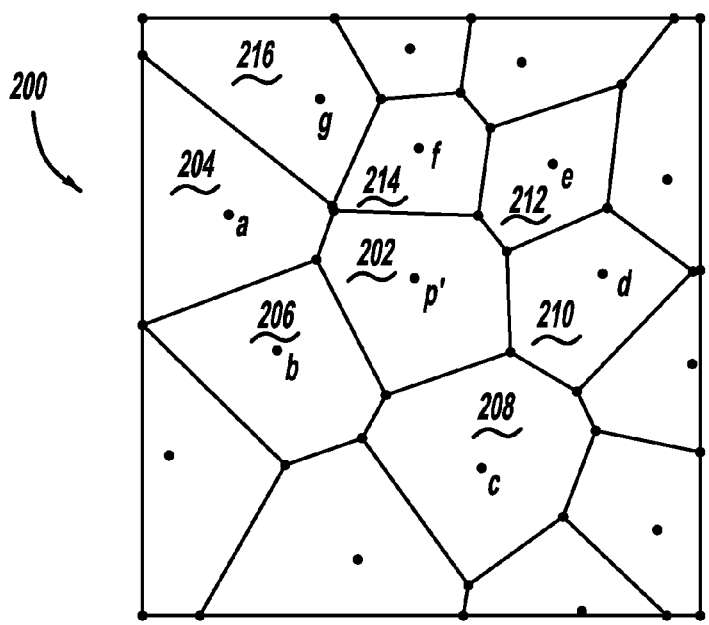
FIG. 4 is a Voronoi diagram of a set of points projected on a ground plane, as used to compute a segmented ground surface, which may not be flat.

FIG. 4 shows a Voronoi diagram 200 of a projected point set $\{p'\}$ on the ground plane. In the diagram 200, the neighbors of a point p' can be defined as the points whose Voronoi cells share a common edge with the cell p'; for example, the points a, b, c, d, e, f, g in cells 204-216 are neighbors of point p' in cell 202 in a Voronoi diagram sense. Therefore, it is possible to construct a graph $G_1=(V, E)$ where the vertex set is the projected point set $\{p'\}$; and the edge set E only includes edges connecting each point to its direct neighbors in the Voronoi diagram 200.

Each edge $(v_i, v_j) \in E$ has a corresponding weight $w(v_i, v_j)$, which is a non-negative measure of the dissimilarity between neighboring elements $v_i$ and $v_j$. In the case of the non-flat ground surface segmentation, the elements in V are projected points on the approximated ground plane and the weight of an edge is a kind of dissimilarity measurement between the two points connected by the edge—that is, points which share a side in the Voronoi diagram. An example of a value which can be used to calculate the edge weight, or value of dissimilarity, is the difference in elevation, as follows;

$$w(v_i,v_j)=|e_i-e_j| \quad (10)$$

where $e_i$ and $e_j$ are the elevation of the vertices $v_i$ and $v_j$, respectively.

Next, an efficient graph-based method is used to segment 3D point clouds into a set of smooth surfaces. A segmentation is a partition of V into non-overlapped subsets such that each subset V' forms a sub-graph $G'_1=(V',E')$, $E' \subseteq E$, corresponding to a connected component (region) of $G_1$. In each segmented component, elements in the same component are similar, while elements from different components are dissimilar.

This indicates that edges between two vertices in the sample component should have relatively lower weights than the weights of point pairs from different components.

A predicate (binary function) P is defined for evaluating whether there exists a boundary between two components $\Gamma_1$ and $\Gamma_2$ as;

$$P(\Gamma_1, \Gamma_2) = \begin{cases} 1 & \text{if } \textit{Diff}(\Gamma_1, \Gamma_2) > MInt(\Gamma_1, \Gamma_2) \\ 0 & \text{Otherwise.} \end{cases} \quad (11)$$

where the function $\textit{Diff}(\Gamma_1, \Gamma_2)$ denotes the mutual difference (dissimilarity) between two components $\Gamma_1, \Gamma_2 \subseteq V$, defined as;

$$\textit{Diff}(\Gamma_1, \Gamma_2) = \min_{v_i \in \Gamma_1, v_j \in \Gamma_2, (v_i, v_j) \in E} w(v_i, v_j) \quad (12)$$

and MInt ($\Gamma_1, \Gamma_2$) denotes the combined internal difference (variation) within $\Gamma_1, \Gamma_2$ that is defined below in Equation (13). A nonzero value for the predicate P means a boundary condition exists and thus the two components are disjoint. Equation (11) has an intuitive interpretation; the components $\Gamma_1, \Gamma_2$ are disjoint if their mutual difference measure is larger than the combined internal variation of both components.

The internal difference measure of a component F is defined as the largest weight among the edges in the component's minimum span tree.

$$Int(\Gamma) = \max_{e \in MST(\Gamma, E)} w(e),$$

where $MST(\Gamma, E)$ is the minimum span tree. Thus the combined internal variation MInt ($\Gamma_1, \Gamma_2$) is designed as;

$$MInt(\Gamma_1, \Gamma_2) = \min(Int(\Gamma_1) + \tau(\Gamma_1), Int(\Gamma_2) + \tau(\Gamma_2)) \quad (13)$$

The heuristic function $\tau$ tunes the degree to which the mutual difference must be greater than their internal variation in order for determining whether or not a boundary condition exists. Two examples of the heuristic function T are listed as below.

First, a threshold function based on the size of the component;

$$\tau(\Gamma) = \frac{k_s}{|\Gamma|} \quad (14)$$

where $|\Gamma|$ denotes the size of the set $\Gamma$. Equation (14) implies that for small component size we require stronger evidence for a boundary. A large value of the parameter $k_s$ causes a preference for large size components.

Second, a threshold function based on the distance from the origin where the host is located;

$$\tau(\Gamma) = \frac{k_r}{r(\Gamma)} \quad (15)$$

where $r(\Gamma)$ denotes the average location of the component $\Gamma$, and $k_r$ is a preselected parameter.

Equation (15) implies nearby components require stronger boundary evidence than components faraway. This is because scan points are much denser (more information) in a nearby region than those in a distant region (less information). A small value of the parameter $k_r$ causes a preference for large size components in nearby regions.

Now the graph-based segmentation algorithm can be defined. The input is a graph $G_1 = (V, E)$ with N vertices and M edges. The output is a segmentation of V into components $C = (\Gamma_1, \ldots, \Gamma_c)$. The steps are outlined below:

1) Sort E into $(e_1, e_2, \ldots, e_m)$ by non-decreasing edge weight
2) Start with a segmentation $C^0$, where each vertex is in its own component
3) Construct the partition $C^n$ based on $C^{n-1}$ as follows:
    a) Directly copy $C^{n-1}$ to $C^n$
    b) Let $(v_i, v_1)$ be the edge $e_n$, the nth edge in the ordered edge list; if $v_i$ and $v_j$ are in separate components $\Gamma_i$ and $\Gamma_j$, and the predicate $P(\Gamma_i, \Gamma_j)$ is false, then merge the two component $\Gamma_i$ and $\Gamma_j$ into $\Gamma_i$ of $C^n$ and remove $\Gamma_j$ from $C^n$
    c) Repeat step 3) for $n = 1, \ldots, M$
4) Output the set $C^M$ as C Once the segmentation result from the above algorithm is obtained, it is possible to identify the ground surface point set $\Gamma_{ground}$, which is the largest component in C enclosing the host vehicle location—that is, the origin of the vehicle coordinate frame.

The above discussion outlines a generic method if only the 3D point cloud is known. Directly applying this method may be computationally intensive. In the following discussion, it is assumed that, besides 3D position, for each scan point the location of the scan raster grid is known—that is, the row and column of the corresponding pixel. Here the algorithm can be redesigned to take advantage of this raster grid information for improved computational efficiency.

Figure 5:
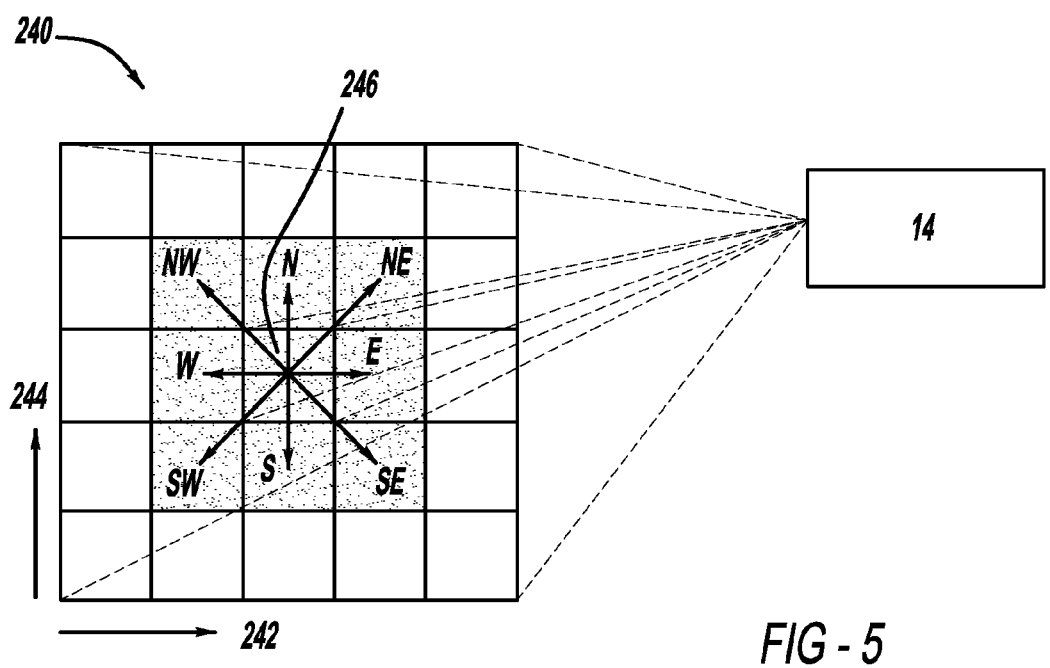
FIG. 5 is a diagram showing how scan points are arranged in a grid to improve the efficiency of the segmented ground surface computation.

FIG. 5 is a diagram 240 showing how rangefinder scan points are arranged in a two-dimensional grid. Due to the physical design of most 3D rangefinder sensors, such as the laser rangefinder 14, the scan points may be organized as shown in the diagram 240. Each pixel represents a specific spherical angle and contains the range measurement to the closest obstacle surface. The sensor scans along a horizontal scan line 242 and a vertical scan line 244 and naturally creates a grid graph $G_2 = (V, E)$ with V being the set of projected points, and edge E containing edges incident from a pixel to its neighborhood only. The diagram 240 shows an example where edges are incident from a pixel 246 to its 8 neighbors; N, NE, E, SE, S, SW, W, NW, in the inner 3×3 grid.

Each edge $(v_i, v_j) \in E$ has a corresponding weight $w(v_i, v_j)$, which is defined as;

$$w(v_i, v_j) = \begin{cases} |e_i - e_j| & \text{if } \|p'_i - p'_j\| < T_{sep} \\ \infty & \text{Otherwise.} \end{cases} \quad (16)$$

where $(p'_i, e_i)$ and $(p'_j, e_j)$ denote the projection and elevation for the vertices $v_i$ and $v_j$, respectively, and $T_{sep}$ is a distance threshold (e.g., 1.2 m). Note that an edge with infinite weight can be removed from E.

Note that the modified segmentation algorithm decouples the horizontal and vertical edge processing. The four-step segmentation algorithm described above is first applied to each horizontal scan line individually with only horizontal edges considered—that is, edges E and W in the diagram 240. Then the segmented slices in horizontal scan lines are merged based on the defined predicate value using the vertical edges—that is, NW, N, NE, SW, S, and SE in the diagram 240.

The input to the modified segmentation algorithm is a grid graph $G_2=(V, E)$ with N vertices. The edge set $E=E_H \cup E_V$ consists of horizontal and vertical edges, respectively. Let the vertical edge set $E_V$ have $M_V$ edges. The output is a segmentation of V into components $C=(\Gamma_1, \ldots, \Gamma_c)$. The detailed algorithm is described below:

1) For each horizontal scan line r:
   a) Construct the subgraph $G_r=(V_r, E_r)$ with vertices $V_r$, being the r-th scan line; and $E_r \subset E$ including only internal horizontal edges within $V_r$,
   b) Apply four-step segmentation algorithm described above to row graph $G_r$.
2) Sort all vertical edges $E_V$ into $(e_1, e_2, \ldots, e_{M_V})$ by non-decreasing edge weight
3) Start with a segmentation $C^0$, containing all components derived in Step 1) and 2)
4) Construct the partition $C^n$ based on $C^{n-1}$ as follows:
   a) Directly copy $C^{n-1}$ to $C^n$
   b) Let $(v_i, v_j)$ be the edge $e_n$, the n-th edge in the ordered vertical edge list; if $v_i$ and $v_j$ are in separate components $\Gamma_i$ and $\Gamma_j$, and the predicate $P(\Gamma_i, \Gamma_j)$ is false, then merge the two component $\Gamma_i$ and $\Gamma_j$ into $\Gamma_i$ of $C^n$ and remover $\Gamma_j$ from $C^n$
   c) Repeat step 4) for each vertical edge in $G_2$, i.e., n=1, ..., $M_v$
5) Output the set $C^M$ as C The discussion above provides several methods for computing an accurate representation of the ground surface—either a flat plane, or a segmented surface representation—based on scan point data. With the ground surface defined, and ground points distinguished from the set of all scan points, static and dynamic objects can now be identified.

Figure 6:
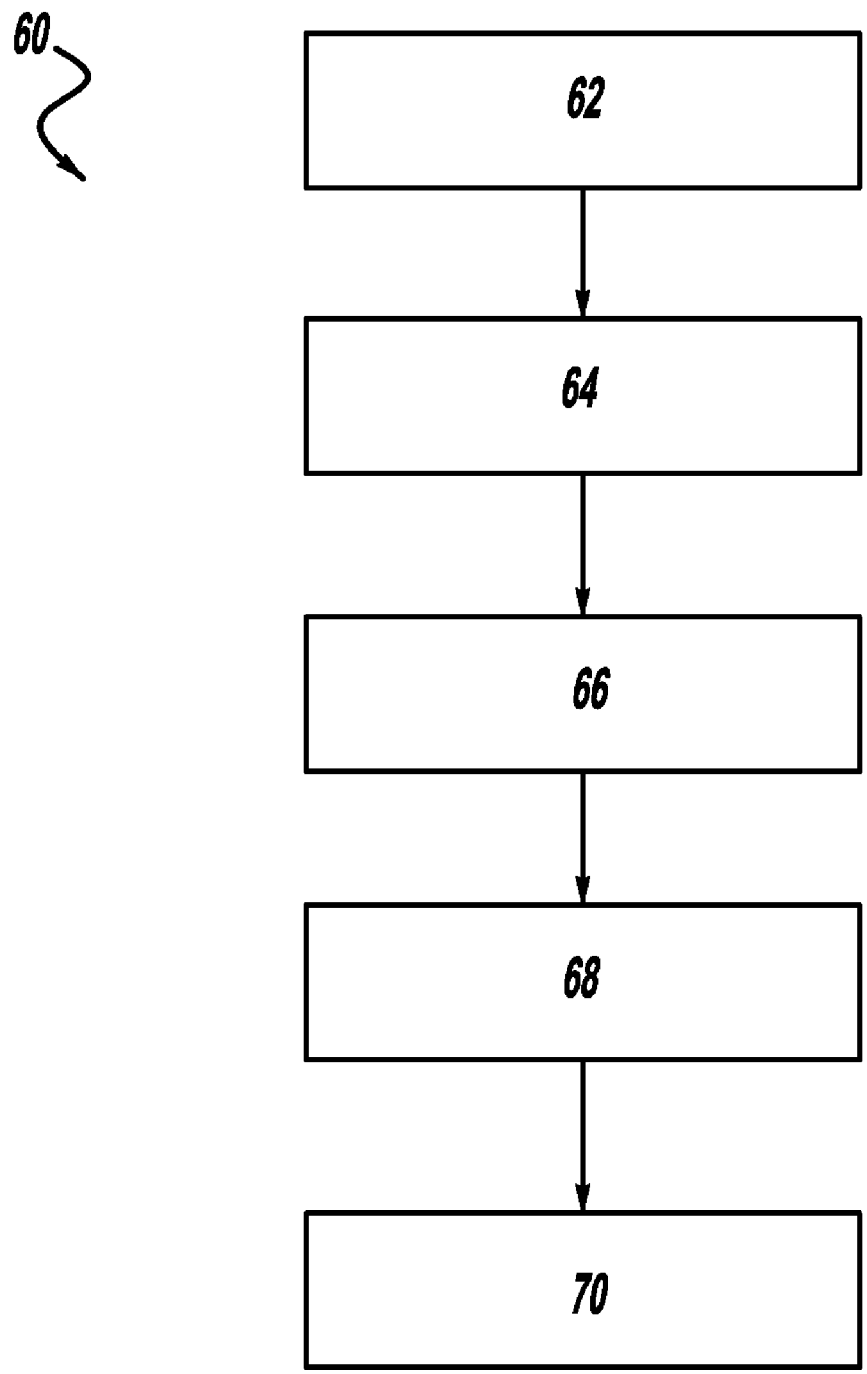
FIG. 6 is a flow chart diagram of a process used by the stationary occupancy map module of the software system of FIG. 2.

FIG. 6 is a flow chart diagram 60 of a process used by the stationary occupancy map module 36 of the software system 30. The purpose of the stationary occupancy map module 36 is to define the location, shape, and height of all stationary objects within a range of interest of the vehicle 12. The stationary occupancy map module 36 can be invoked by the overall image processing module 32, each time the ground plane tracking module 34 provides an updated ground plane, or at any other suitable time interval. At box 62, the 3-D scan points from the laser rangefinder 14 are provided. Ground points can be removed from the scan points at the box 62, so that the remaining scan points all represent objects above ground. At box 64, the updated ground plane or surface is provided from the ground plane tracking module 34. At box 66, all scan points from the box 62 are projected onto the ground plane or surface, as is described in the detailed discussion below. The projection of all scan points onto the ground surface at the box 66 provides a set of vectors, with each vector running from a scan point normal to the ground plane or surface.

The vectors created at the box 66 can then be used to construct a 2-D elevation map at box 68. The 2-D elevation map shows the height and location relative to the ground plane or surface of all objects as represented by the scan points. At box 70, a binary occupancy map can be constructed, showing the location in the ground plane of all objects within the range of interest of the vehicle 12. Construction of the binary occupancy map of the box 70 begins by taking all of the points in the ground plane or surface where the normal vectors from the box 66 intersect. Each of these ground plane projection points is assigned a threshold object size, such as 10 cm square, which results in a first set of 2-D shapes in the ground plane. The 2-D shapes can be clustered together where they touch or overlap, providing a second set of larger 2-D shapes in the ground plane, each representing the area occupied by some stationary object.

Following is a detailed discussion of the calculations used in the flow chart diagram 60.

Let Gnd denote the set of scan points labeled as ground. The remaining scan points, those representing objects, can be written as 0=Sen–Gnd where Sen is the set of sensor scan point clouds.

Let $0=\{q_k | k=1, \ldots, K\}$. Given a point $q_k$, Neighbor($q_k$) is denoted as the set of ground points closest to $q_k$. Let $\Omega(q_k)$ denote the fitted plane based on the ground points Neighbor($q_k$). Then the elevation of $q_k$ can be defined as the distance from $q_k$ to the plane $\Omega(q_k)$;

$$elev(q_k) = \frac{A_\Omega x_k + B_\Omega y_k + C_\Omega z_k + d_\Omega}{\sqrt{A_\Omega^2 + B_\Omega^2 + C_\Omega^2}} \quad (17)$$

where $A_\Omega x + B_\Omega y + C_\Omega z + d_\Omega = 0$ denotes the plane equation for $\Omega(q_k)$ and $q_k=(x_k, y_k, z_k)^T$. A positive value of elev($q_k$) means the point is above the ground, while a negative value means the point is below the ground. Only points above the ground are considered for object detection. The elevation of each point $q_k$ can be used to construct the 2D elevation map.

Then the binary static occupancy map can be constructed as;

$$occup(q_k) = \begin{cases} 1 & \text{if } |elev(q_k)| > T_{elev} \\ 0 & \text{Otherwise.} \end{cases} \quad (18)$$

where occup($q_k$) is an indicator function to determine whether each point $q_k$ is an obstacle point, and $T_{elev}$ is a small elevation threshold.

Figure 7:
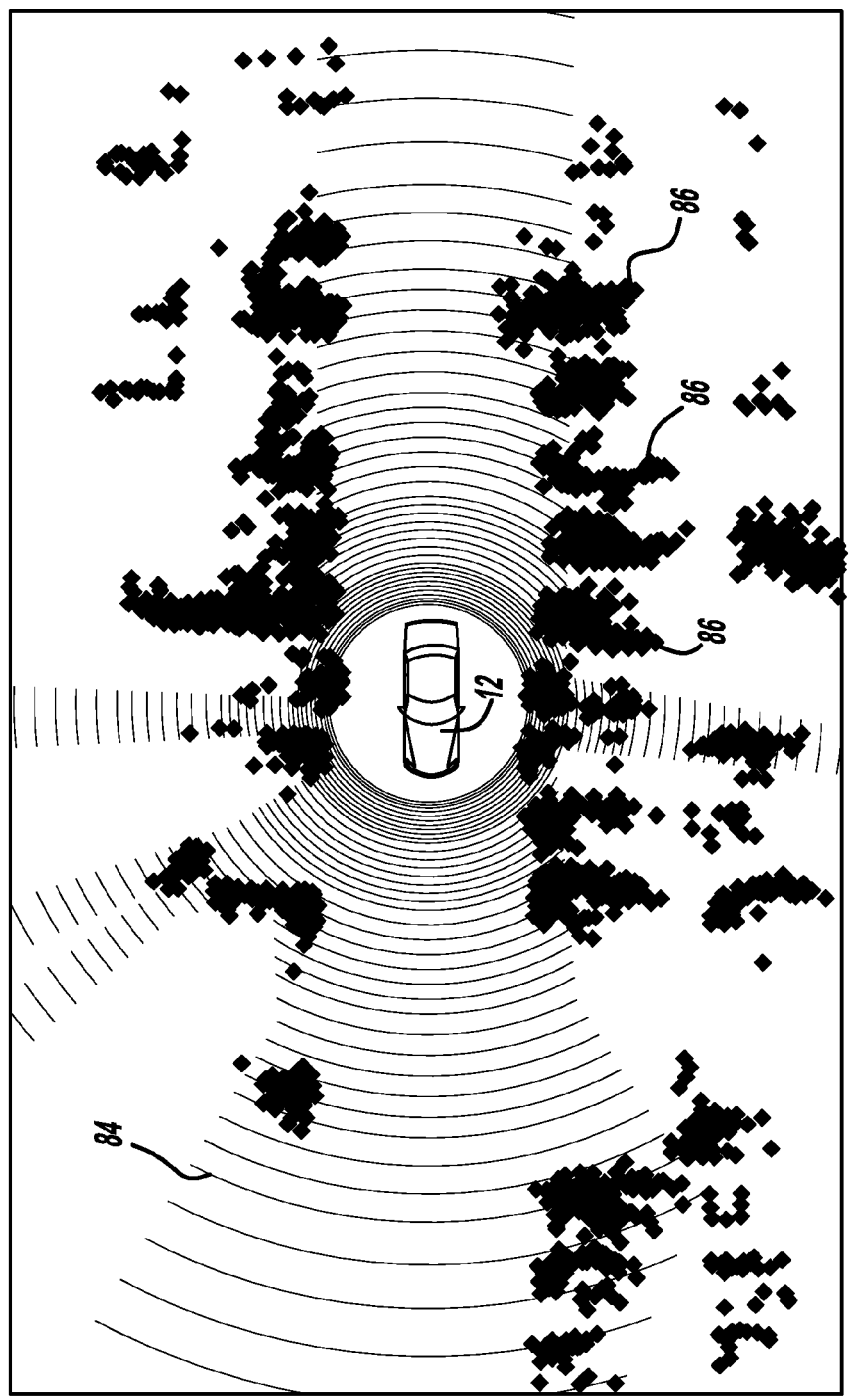
FIG. 7 is an example of a binary occupancy map as produced by the stationary occupancy map module of the software system of FIG. 2.

FIG. 7 is an example of a binary static occupancy map 80 as produced by the stationary occupancy map module 36. The binary static occupancy map 80 shows the vehicle 12 at the center, surrounded by concentric arcs 84 which represent the scan pattern of the laser rangefinder 14. Numerous objects 86 populate the occupancy map 80, where each object 86 represents a cluster of points where a hit was returned by the laser rangefinder 14, with the points being projected onto the ground plane. These are the points $q_k$ which were determined to be occupied, as described above. It can be seen in this example that the objects 86 are situated along the sides of the road on which the vehicle 12 is travelling. The 2-D elevation map, described above, adds height information to the occupancy information contained in the occupancy map 80.

Figure 8:
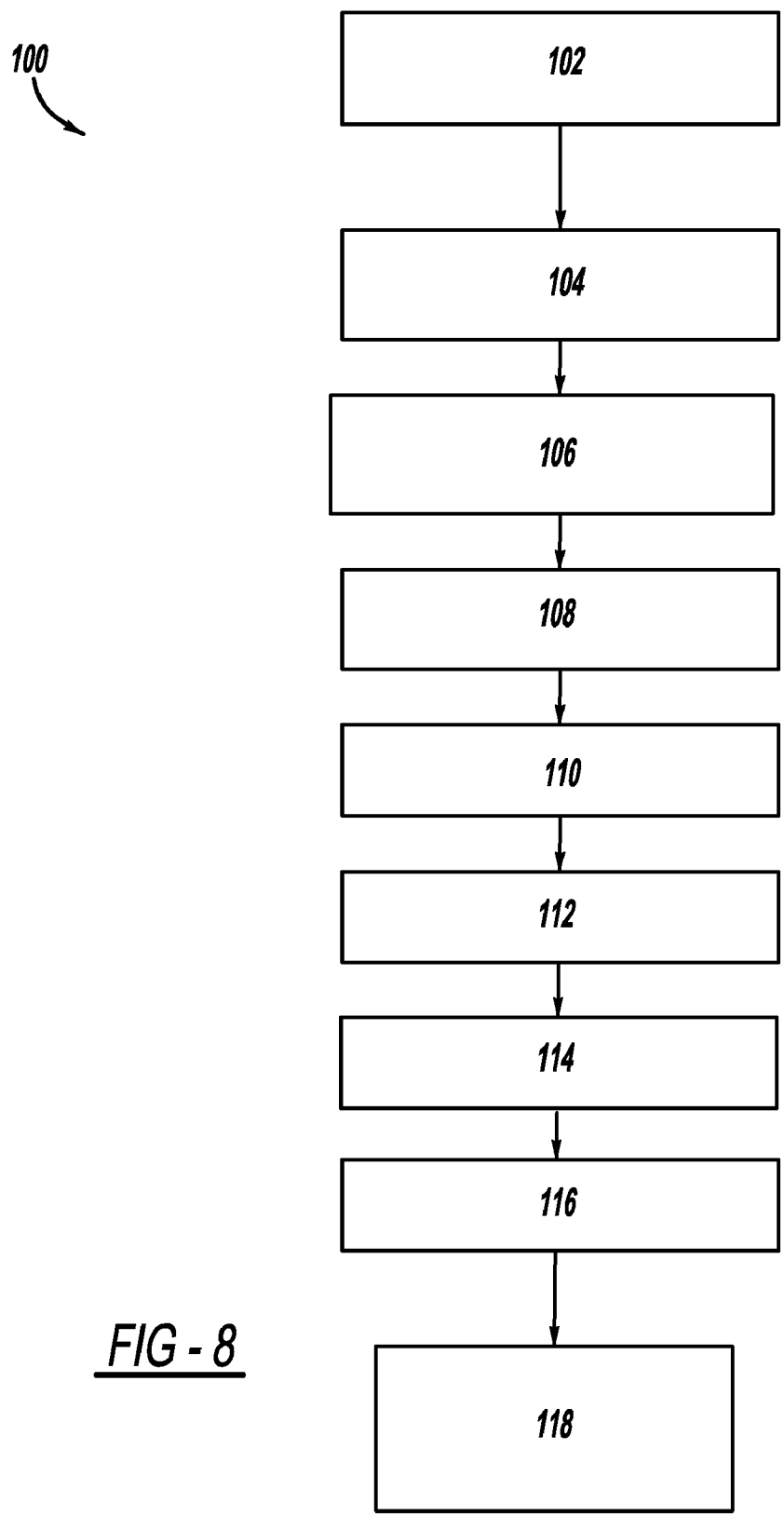
FIG. 8 is a flow chart diagram of a process used by the dynamic object tracking module of the software system of FIG. 2.

After the stationary occupancy map module 36 has been executed, as described above, the dynamic object tracking module 38 can be invoked. FIG. 8 is a flow chart diagram 100 of a process used by the dynamic object tracking module 38 of the software system 30. The purpose of the dynamic object tracking module 38 is to define the location, shape, and velocity of all moving objects, or objects with a non-zero ground speed, within the range of interest of the vehicle 12. The dynamic object tracking module 38 can be invoked by the overall image processing module 32, each time the stationary occupancy map module 36 provides an updated occupancy map 80, or at any other suitable time interval. At box 102, the 3-D scan points from the laser rangefinder 14 are provided. At box 104, ground points are removed from the scan point data, where the ground points were identified at the box 54 of the process shown on the flow chart diagram 40. After the ground points are removed at the box 104, the scan points which represent objects can be further processed to identify dynamic or moving objects.

At box 106, the most recent static occupancy map, of which the static occupancy map 80 is an example, is provided by the stationary occupancy map module 36. At box 108, a similarity graph is constructed to determine which object points are related to which others—that is, which points are considered to result from the same object. At box 110, object clustering is completed, and the shape and size of dynamic objects are determined. At box 112, classification of each dynamic object is completed, such that each dynamic object can be identified as a vehicle, a pedestrian, a bicycle, an animal, or some other type of moving object, based on its shape and size. At box 114, the centroid of each dynamic object is computed from the object's shape, and the position and velocity of the objects is tracked at box 116. The dynamic object data—including size, shape, potential identification, position, and velocity of all dynamic objects—is output at box 118.

Following is a detailed discussion of the calculations used in the flow chart diagram 100.

After the set of object points and the occupancy map are provided, a similarity graph is constructed, defined as $G_3=(V, E)$ where the vertex set is defined as the points above ground—that is, $V=\{q_l | l=1, \ldots, N_o\}$, $\forall l \text{elev}(q_l) > T_{elev}$, and the edge set E is defined as a set of point pairs if each point pair's distance is less than a threshold ($T_{sep}$), i.e., $E=\{(q_l, q_n) | \|q_l - q_n\| < T_{sep}\}$.

An efficient $O(N_0)$ clustering algorithm based on a connected component partition method is proposed here. A depth-first search (DFS) strategy is applied to the graph $G_3$.

The DFS clustering function is described below, which requires inputs of V and $T_{sep}$, and outputs a set list $L=\{S_1, \ldots, S_C\}$.

1) For each point $q_l$ in V
   a) If $q_l$ is unvisited, create an empty set S and append to the set list L
   b) Call DFS function with arguments $q_l$, S, V, and $T_{sep}$ The DFS function is described below, which requires inputs of q, S, V, and $T_{sep}$, and outputs a set S.

Figure 9:
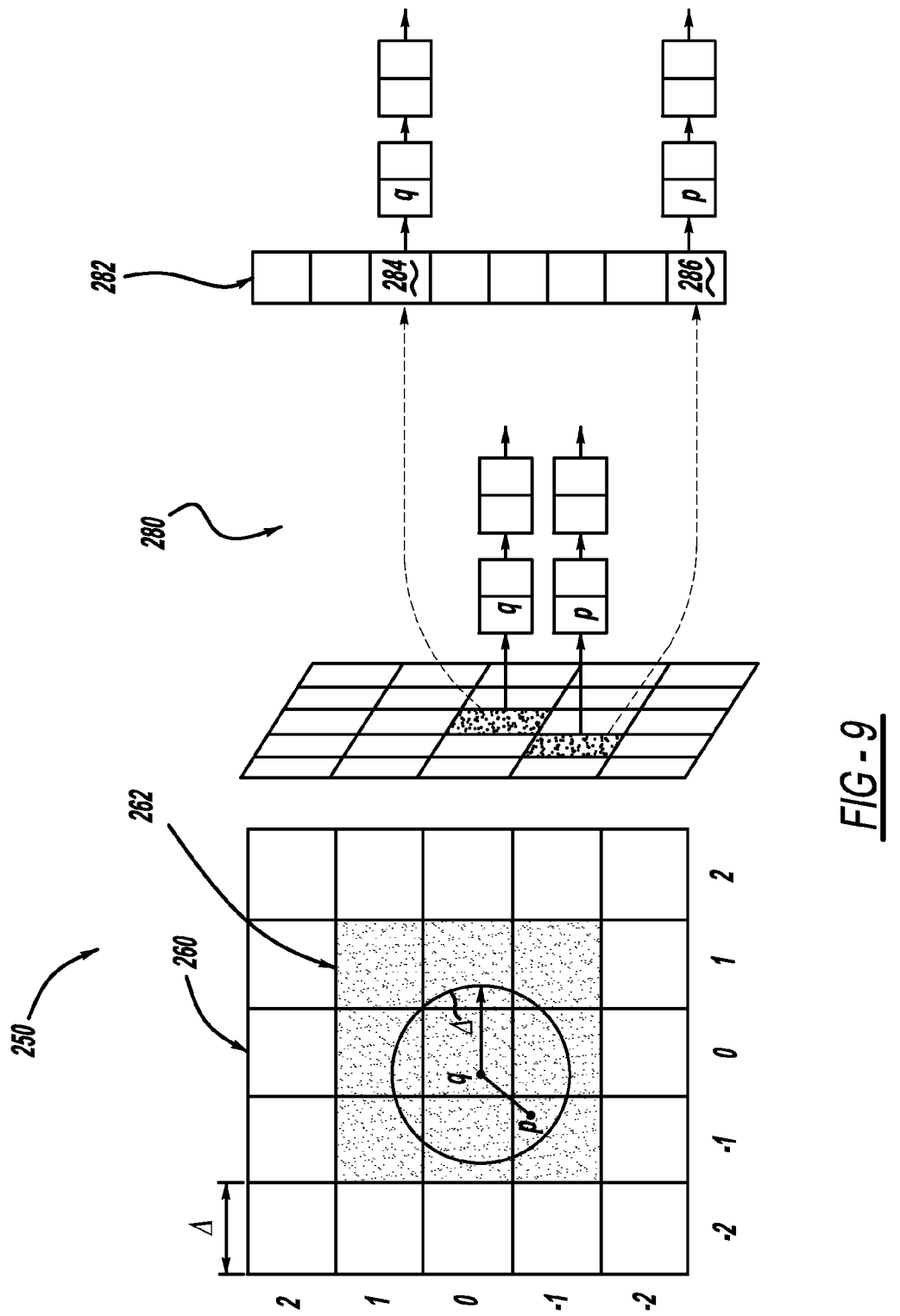
FIG. 9 is a diagram showing how scan points are clustered into objects in the dynamic object tracking module of the software system of FIG. 2.

1) Insert point q into set S
2) Mark q as a visited point
3) If there exists another point p∈V such that $\|p-q\| < T_{sep}$
   a) Recursively call DFS function with arguments p, S, V, and $T_{sep}$ Note that in the above algorithm the DFS strategy is implemented in $G_3$ although explicit construction of the graph $G_3$ is not needed. The step 3 in the DFS function has a constant time complexity (i.e., $0(1)$) implementation. FIG. 9 is a diagram 250 showing how points are clustered into objects using the DFS strategy. A grid data structure 260 is designed to hold the points in V. Each point is assigned to a cell based on its location in the X-Y plane, e.g., point q=(x, y, z) is located in the cell $$\left(\left\lfloor \frac{x}{\Delta} \right\rfloor, \left\lfloor \frac{y}{\Delta} \right\rfloor\right),$$

denoted as q-cell. If more than two points fall into a cell, a linked list 280 is used.

Note that for every point q, all of its direct neighbors that have an edge linked to q lie in a 3×3 grid centered at the cell holding the point q. This can be seen in the diagram 250 by observing that all circles of radius Δ centered within cell (0,0) are inside 3×3 grid 262. Therefore, Step 3 in the DFS function can be changed to:

3) If there exists another point p which belongs to the 3×3 grid centered at the q-cell such that $\|p-q\| < T_{sep}$ Assuming there are a constant number of points within the 3×3 grid 262, the complexity of Step 3 is constant time, i.e., $0(1)$. As outlined in the DFS clustering function, each point in the set V is visited only once, thus the complexity of the whole clustering algorithm is $0(N_0)$.

As shown in the diagram 250, the distribution of 3D points in the grid is sparse, that is, not all cells are occupied with points. Thus, a hash table 282 can be used to implement the grid. Each occupied cell is mapped into a table entry based on its cell index; for example, cell (0,0) is mapped to a third table entry 284, and cell (−1,1) is mapped to an eighth table entry 286.

The centroid of an object cluster is defined as the sample mean of the cluster. Let the c-th set (object cluster) $S_c=\{p_j | j=1, \ldots, J\}$, $\forall p_i \forall p_j \in S_c, i \neq j \rightarrow \|p_i - p_j\| > T_{sep}$, consist of J points with the distance between each point pair less than $T_{sep}$. The centroid can be written as;

$$\bar{p}_c = \frac{\sum_{j=1}^{J} p_j}{J} \tag{19}$$

The geometric size of the cluster can be computed through eigen-decomposition of the following matrix;

$$D = \frac{1}{J}\sum_{j=1}^{J}(p_j - \bar{p}_c)(p_j - \bar{p}_c)^T \tag{20}$$

Namely, $D=U\Lambda U^T$ where $\Lambda$ is a diagonal matrix with diagonal elements being eigenvalues, and the columns of the orthogonal matrix $U=(u_1, u_2, u_3)$ are the corresponding eigenvectors.

The minimum and maximum values of the dot product of the points $p_j$ with three principal axes (the three eigenvectors), respectively, are then computed. For example, the size along the principal axis $u_n$ can be written as $\text{Len}_n = \max_j(p_j^T u_n) - \min_j(p_j^T u_n)$, n=1, 2, 3. The size of the cluster can be used for classification of the cluster as a vehicle, a pedestrian, a bicycle, an animal, etc.

A Kalman filter is used to track the centroid of an object cluster. The state vector for a track is defined as $s=(x, y, v_x, v_y)$, which represents the track's longitudinal displacement, lateral displacement, longitudinal velocity, and lateral velocity, respectively.

A constant-velocity model (CV) is used as the target dynamic model. Thus, the new state vector of the track s' can be predicted from s as;

$$s' = As + v_{cv} \tag{21}$$

where $$A = \begin{bmatrix} 1 & 0 & \Delta T & 0 \\ 0 & 1 & 0 & \Delta T \\ 0 & 0 & 1 & 0 \\ 0 & 0 & 0 & 1 \end{bmatrix},$$

$v_{cv}$ is the zero-mean Gaussian white noise vector, and $\Delta T$ is the sample time interval.

Let the object cluster centroid $\bar{p}_c = (\bar{x}_c, \bar{y}_c)^T$, skipping the z-component. The measurement equation can be written as;

$$\bar{p}_c = Hs + w_c \qquad (22)$$

where $$H = \begin{bmatrix} 1 & 0 & 0 & 0 \\ 0 & 1 & 0 & 0 \end{bmatrix},$$

and $w_c$ is a zero-mean Gaussian white noise vector to model the measurement process.

Then a Kalman filter is applied to Equations (21) and (22) to estimate the state vector. The geometry information of the track uses the values of the cluster's geometrical shape (e.g., the size along the principal axes).

The stationary object mapping and dynamic object tracking data, produced by the modules 36 and 38 of the software system 30, provide a complete and accurate representation of objects in the vicinity of the vehicle 12. By using the laser scan technology and specialized data processing algorithms described above, the disclosed methods and system can overcome many problems experienced by other object detection systems, thus providing better quality information to downstream applications onboard the vehicle, such as collision detection and semi-autonomous driving systems.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for detecting and tracking objects near a vehicle, said method comprising:
   providing a plurality of scan points from a laser rangefinder, said scan points representing locations in a space surrounding the vehicle where an object has been detected by the laser rangefinder;
   using the scan points and vehicle dynamics data to establish a location of a ground plane;
   using the scan points and the location of the ground plane to construct an object occupancy map and an object elevation map; and
   using the scan points and the object occupancy map to create dynamic object data, where the dynamic object data identifies and tracks objects which are moving.

2. The method of claim 1 wherein using the scan points and vehicle dynamics data to establish a location of a ground plane includes:
   using vehicle pitch and roll angle data to calculate a predicted ground plane location from a previous ground plane location;
   performing a gating operation on the scan points, where the gating operation uses the predicted ground plane location to identify a set of points which are to be included in a ground plane computation;
   creating a matrix containing the set of points which are to be included in the ground plane computation;
   performing an eigenvalue decomposition on the matrix to identify a smallest eigenvalue and an eigenvector associated with the smallest eigenvalue; and
   using the eigenvector associated with the smallest eigenvalue to determine an equation for the ground plane.

3. The method of claim 2 further comprising providing an updated ground plane location using a Kalman filter.

4. The method of claim 1 wherein using the scan points and the location of the ground plane to construct an object occupancy map and an object elevation map includes:
   projecting each of the scan points onto the ground plane to determine both a ground plane intersection point and a normal vector for each of the scan points;
   using the normal vectors for all of the scan points to build an object elevation map, where the object elevation map shows height information for all objects detected in the space surrounding the vehicle; and
   using the ground plane intersection points for all of the scan points to build the object occupancy map, where the object occupancy map shows location information for all objects detected in the space surrounding the vehicle.

5. The method of claim 1 wherein using the scan points and the object occupancy map to create dynamic object data includes:
   removing ground points from the scan points to create a set of object points;
   using the object occupancy map most recently computed;
   constructing a similarity graph to determine which of the object points are moving together;
   clustering groups of the object points which are moving together into dynamic objects;
   classifying the dynamic objects into object types, where the object types include vehicle, pedestrian, bicycle, and animal;
   computing centroids of the dynamic objects; and
   tracking the dynamic objects to create the dynamic object data.

6. The method of claim 5 wherein clustering groups of the object points which are moving together into dynamic objects uses a Depth First Search strategy.

7. The method of claim 5 wherein tracking the dynamic objects uses a Kalman filter.

8. The method of claim 5 wherein the dynamic object data includes a longitudinal and lateral position and a longitudinal and lateral velocity relative to ground of each of the dynamic objects.

9. The method of claim 1 further comprising using the object occupancy map and the dynamic object data in an application in the vehicle.

10. A method for detecting and tracking objects near a vehicle, said method comprising:
    providing a plurality of scan points from a laser rangefinder, said scan points representing locations in a space surrounding the vehicle where an object has been detected by the laser rangefinder;
    using the scan points and vehicle dynamics data to establish a definition of a ground surface;
    using the scan points and the definition of the ground surface to construct an object occupancy map and an object elevation map;

using the scan points and the object occupancy map to create dynamic object data, where the dynamic object data identifies and tracks objects which are moving; and using the object occupancy map and the dynamic object data in an application in the vehicle.

11. The method of claim 10 wherein using the scan points and vehicle dynamics data to establish a definition of a ground surface includes using a Voronoi diagram method to construct a non-flat ground surface segmentation.

12. The method of claim 10 wherein using the scan points and the definition of the ground surface to construct an object occupancy map and an object elevation map includes:

projecting each of the scan points onto the ground surface to determine both a ground surface intersection point and a normal vector for each of the scan points;

using the normal vectors for all of the scan points to build an object elevation map, where the object elevation map shows height information for all objects detected in the space surrounding the vehicle; and using the ground surface intersection points for all of the scan points to build the object occupancy map, where the object occupancy map shows location information for all objects detected in the space surrounding the vehicle.

13. The method of claim 10 wherein using the scan points and the object occupancy map to create dynamic object data includes:

removing ground points from the scan points to create a set of object points;

using the object occupancy map most recently computed;

constructing a similarity graph to determine which of the object points are moving together;

clustering groups of the object points which are moving together into dynamic objects;

classifying the dynamic objects into object types, where the object types include vehicle, pedestrian, bicycle, and animal;

computing centroids of the dynamic objects; and tracking the dynamic objects to create the dynamic object data.

14. The method of claim 13 wherein clustering groups of the object points which are moving together into dynamic objects includes constructing a similarity graph, using a depth-first search strategy, and using a grid data structure with a hash table.

15. A system for detecting and tracking objects near a vehicle, said system comprising:

a laser rangefinder in the vehicle for providing a plurality of scan points, where the scan points represent locations in a space surrounding the vehicle where an object has been detected by the laser rangefinder;

a first processor configured to compute a ground surface and create an object occupancy map using the scan points;

a second processor configured to identify and track dynamic objects using the object occupancy map and the scan points; and a shared memory module for sharing data between the first processor and the second processor.

16. The system of claim 15 wherein the first processor includes a ground surface tracking module, said ground surface tracking module including a gating algorithm for identifying a set of points to be included in a ground plane computation matrix, and an eigenvalue decomposition algorithm for computing an equation of a ground plane from the ground plane computation matrix.

17. The system of claim 16 wherein the ground surface tracking module in the first processor also includes a ground surface segmentation algorithm which uses a Voronoi diagram method to construct a non-flat ground surface segmentation.

18. The system of claim 15 wherein the first processor includes an object occupancy module, said object occupancy module including a ground surface projection algorithm for projecting all scan points orthogonally onto the ground surface, an elevation map construction algorithm for constructing an elevation map which shows height information for all of the objects detected in the space surrounding the vehicle, and an occupancy map construction algorithm for constructing the occupancy map showing location information for all of the objects detected in the space surrounding the vehicle.

19. The system of claim 15 wherein the second processor includes an object clustering module for clustering object points which are moving together into dynamic objects, an object classification module for classifying the dynamic objects into object types, and an object tracking module for providing position and velocity information about each of the dynamic objects.

20. The system of claim 15 further comprising a second laser rangefinder in the vehicle.

* * * * *